(12) United States Patent
Wang

(10) Patent No.: US 9,886,145 B2
(45) Date of Patent: Feb. 6, 2018

(54) CAPACITIVE TOUCHSCREEN AND TERMINAL

(71) Applicant: HUAWEI DEVICE (DONGGUAN) CO., LTD., Dongguan (CN)

(72) Inventor: Peng Wang, Beijing (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 0 days.

(21) Appl. No.: 14/532,562

(22) Filed: Nov. 4, 2014

(65) Prior Publication Data

US 2015/0054786 A1 Feb. 26, 2015

Related U.S. Application Data

(63) Continuation of application No. PCT/CN2013/074443, filed on Apr. 19, 2013.

(30) Foreign Application Priority Data

May 4, 2012 (CN) .......................... 2012 1 0137212

(51) Int. Cl.
*G06F 3/044* (2006.01)
*G06F 1/16* (2006.01)
*G06F 3/041* (2006.01)

(52) U.S. Cl.
CPC ............ *G06F 3/044* (2013.01); *G06F 1/1643* (2013.01); *G06F 3/0412* (2013.01); *G06F 3/0416* (2013.01); *G06F 2203/04103* (2013.01)

(58) Field of Classification Search
CPC ........... G06F 1/1643; G06F 2203/0411; G06F 1/1692; G06F 3/044; G06F 2203/04103; G06F 2203/04112; G02F 1/13338; G02F 2001/133342; H03K 2217/960755
See application file for complete search history.

(56) References Cited

U.S. PATENT DOCUMENTS

| 5,684,692 A | 11/1997 | Williams et al. |
| 2008/0143683 A1 | 6/2008 | Hotelling |

(Continued)

FOREIGN PATENT DOCUMENTS

| CN | 101957700 A | 1/2011 |
| CN | 102375626 A | 3/2012 |

(Continued)

OTHER PUBLICATIONS

Partial English Translation and Abstract of Chinese Patent Application No. CN102707856A, Nov. 28, 2014, 3 pages.

(Continued)

*Primary Examiner* — Grant Sitta
*Assistant Examiner* — Amen Bogale
(74) *Attorney, Agent, or Firm* — Conley Rose, P.C.

(57) ABSTRACT

The capacitive touchscreen includes a substrate including a first surface and a second surface; a first pattern and a first outgoing wire that are formed on the first surface of the substrate, where the first pattern covers a partial area of the first surface of the substrate, and the first outgoing wire is formed in a remaining area, except the first pattern, of the first surface of the substrate; and a second pattern and a second outgoing wire that are formed on the second surface of the substrate, where the second pattern covers a partial area of the second surface of the substrate, and the second outgoing wire is formed in a remaining area, except the second pattern, of the second surface of the substrate. The first surface and the second surface are two opposite surfaces of the substrate.

15 Claims, 5 Drawing Sheets

(56) References Cited

U.S. PATENT DOCUMENTS

| | | | |
|---|---|---|---|
| 2008/0150903 | A1 | 6/2008 | Chuang |
| 2010/0220076 | A1 | 9/2010 | Nagata et al. |
| 2011/0247884 | A1* | 10/2011 | Kim .................. G06F 3/044 178/18.03 |
| 2011/0291963 | A1* | 12/2011 | Woo ................... G06F 3/0412 345/173 |
| 2012/0062486 | A1 | 3/2012 | Rho |
| 2012/0068961 | A1 | 3/2012 | Mizuhashi et al. |
| 2012/0118614 | A1* | 5/2012 | Kuriki ................. G06F 3/044 174/250 |
| 2012/0154323 | A1* | 6/2012 | Nambu ............... G06F 3/0416 345/174 |
| 2012/0242613 | A1 | 9/2012 | Hsu |
| 2013/0153390 | A1* | 6/2013 | Lee ..................... G06F 3/044 200/600 |
| 2013/0162328 | A1* | 6/2013 | Lee ..................... G06F 3/044 327/517 |
| 2013/0162547 | A1* | 6/2013 | Yoo .................... G06F 3/041 345/173 |

FOREIGN PATENT DOCUMENTS

| | | |
|---|---|---|
| CN | 202205184 U | 4/2012 |
| CN | 102707856 A | 10/2012 |
| EP | 2306283 A2 | 4/2011 |
| JP | H03235113 A | 10/1991 |
| JP | H09128133 A | 5/1997 |
| JP | 20090009249 A | 1/2009 |
| JP | 3174553 U | 3/2012 |
| JP | 2012064134 A | 3/2012 |
| JP | 2012068760 A | 4/2012 |
| KR | 20120067270 A | 6/2012 |
| WO | 2010075308 A2 | 7/2010 |

OTHER PUBLICATIONS

Foreign Communication From A Counterpart Application, Chinese Application No. 201210137212.5, Chinese Office Action dated Aug. 22, 2014, 3 pages.

Foreign Communication From A Counterpart Application, Chinese Application No. 201210137212.5, Chinese Search Report dated Jul. 24, 2014, 2 pages.

Foreign Communication From A Counterpart Application, PCT Application No. PCT/CN2013/074443, English Translation of International Search Report dated Aug. 1, 2013, 2 pages.

Foreign Communication From a Counterpart Application, PCT Application No. PCT/CN2013/074443, Written Opinion dated Aug. 1, 2013, 7 pages.

Foreign Communication From A Counterpart Application, Korean Application No. 10-2014-7033363, Korean Office Action dated Feb. 29, 2016, 4 pages.

Foreign Communication From A Counterpart Application, Korean Application No. 10-2014-7033363, English Translation of Korean Office Action dated Feb. 29, 2016, 2 pages.

Partial English Translation and Abstract of Japanese Patent Application No. JPA2009009249, Apr. 4, 2016, 36 pages.

Partial English Translation and Abstract of Japanese Patent Application No. JPA2012064134, Apr. 4, 2016, 65 pages.

Partial English Translation and Abstract of Japanese Patent Application No. JPA2012068760, Apr. 4, 2016, 20 pages.

Partial English Translation and Abstract of Japanese Patent Application No. JPH03-235113, Apr. 4, 2016, 10 pages.

Partial English Translation and Abstract of Japanese Patent Application No. JPH09-128133, Apr. 4, 2016, 37 pages.

Partial English Translation and Abstract of Japanese Patent Application No. JPU3174553, Apr. 4, 2016, 15 pages.

Foreign Communication From A Counterpart Application, Japanese Application No. 2015-509287, Japanese Office Action dated Feb. 2, 2016, 2 pages.

Foreign Communication From A Counterpart Application, Japanese Application No. 2015-509287, English Translation of Japanese Office Action dated Feb. 2, 2016, 3 pages.

Foreign Communication From A Counterpart Application, European Application No. 13784784.4, Extended European Search Report dated Jul. 7, 2015, 12 pages.

* cited by examiner

CAPACITIVE TOUCHSCREEN AND TERMINAL

CROSS-REFERENCE TO RELATED APPLICATIONS

This application is a continuation of International Application No. PCT/CN2013/074443, filed on Apr. 19, 2013, which claims priority to Chinese Patent Application No. 201210137212.5, filed on May 4, 2012, both of which are hereby incorporated by reference in their entireties.

TECHNICAL FIELD

Embodiments of the present invention relate to the field of communications technologies, and in particular, to a mobile broadband apparatus.

BACKGROUND

With development of technologies, applications of capacitive touchscreen technologies dominate in intelligent portable devices. As shown in FIG. 1, a capacitive sensing device of a touchscreen on a liquid crystal display (LCD) 7 is formed by plating a substrate 6 with a layer of a transparent and electrically conductive material, for example, an indium tin oxide (ITO) material, and etching the layer to form a corresponding electrically conductive pattern according to a requirement of a touch integrated circuit (IC), where the pattern generally uses the ITO material, that is, an ITO pattern. In the prior art, each electrically conductive pattern generally includes a horizontal sliding strip and a vertical sliding strip, where the horizontal sliding strip, or a horizontal electrode (X electrode), is a pattern 1 of transparent ITO in a horizontal direction (X direction), and the vertical sliding strip, or a vertical electrode (Y electrode), is a pattern 2 of the transparent ITO in a vertical direction (Y direction). It should be noted that the X electrode and the Y electrode are not limited to a hierarchical relationship, and a cover lens 4 adheres to the substrate 6 having the formed ITO pattern using optically clear adhesive 5 (OCA). A touch-sensing principle of a capacitive touchscreen is that when a finger touches a surface of the cover lens 4 covering the ITO pattern, the touch IC determines a location, touched by the finger, using coordinates of an electrode with a variation in capacitance detected on the sensing ITO pattern.

In a prior art design, as shown in FIG. 2, a blank figure represents an X electrode 1, and a figure including slanting stripes represents a Y electrode 2. The X electrode 1 is connected to the touch IC after being wired on two sides of the whole electrically conductive pattern using a leading wire 11 that is in the X direction, and the Y electrode 2 is connected to the touch IC after being wired on a bottom side of the whole electrically conductive pattern using a leading wire 21 that is in the Y direction.

An outgoing wire area that has no touch function and is outside a pattern area providing a touch function needs to be included. Therefore, in an existing design, as shown in FIG. 3 and FIG. 4, a border area, outside a touchscreen area of a device, needs to be reserved for outgoing wires, which leads to a problem of a wider border of a current capacitive touchscreen. For a trend towards a light and thin terminal with a maximized touchscreen display area, width constriction is particularly important. However, in current technical solutions, because the outgoing wire area is incapable of touchscreen sensing, the border cannot be eliminated from existence no matter how a width of the outgoing wire area is constricted, which conflicts with a trend of constricting a terminal width.

SUMMARY

Embodiments of the present invention provide a capacitive touchscreen and a terminal, which can save a need of disposing a border configured to cover an outgoing wire area, thereby reducing a width of a terminal border.

To solve the foregoing technical problem, the embodiments of the present invention use the following technical solutions.

The embodiments of the present invention provide a capacitive touchscreen, including a substrate, the substrate including a first surface and a second surface, where the touchscreen further includes a first pattern and a first outgoing wire that are formed on the first surface of the substrate, where the first pattern covers a partial area of the first surface of the substrate, the first outgoing wire is an outgoing wire, along a first direction, of the first pattern, and the first outgoing wire is formed in a remaining area, except the first pattern, of the first surface of the substrate; and a second pattern and a second outgoing wire that are formed on the second surface of the substrate, where the second pattern covers a partial area of the second surface of the substrate, the second outgoing wire is an outgoing wire, along the first direction, of the second pattern, and the second outgoing wire is formed in a remaining area, except the second pattern, of the second surface of the substrate; where the first surface and the second surface are two opposite surfaces of the substrate, and a perpendicular projection, on the first surface, of the second pattern covers at least the remaining area, except the first pattern, of the first surface.

The embodiments of the present invention further provide a terminal, including a touchscreen, where the touchscreen is the capacitive touchscreen described above.

The embodiments of the present invention further provide a terminal, including a touchscreen, the touchscreen including a substrate, and the substrate including a first surface and a second surface, where the touchscreen further includes a first pattern formed on the first surface of the substrate and a second pattern formed on the second surface of the substrate, the first pattern covers a partial area of the first surface of the substrate, the second pattern covers a partial area of the second surface of the substrate, the first surface and the second surface are two opposite surfaces of the substrate, and a perpendicular projection, on the first surface, of the second pattern covers at least a remaining area, except the first pattern, of the first surface; and the terminal further includes a first scanning unit configured to acquire a first sensing coordinate by scanning the first pattern, a second scanning unit configured to acquire a second sensing coordinate by scanning the second pattern, and a superimposing unit configured to acquire a sensing coordinate according to the first sensing coordinate and the second sensing coordinate.

It can be seen that, a first pattern is formed on a first surface of a substrate, and a second pattern is formed on a second surface of the substrate, so that an area outside an electrically conductive pattern may be reserved separately on each surface of the substrate for outgoing wires. Because the first pattern on the first surface and the second pattern on the second surface are in a mutually complementary relationship, overall touchscreen sensing of the substrate may be completed by collaboration of the electrically conductive patterns on the two surfaces. In this way, a border existing in a current terminal may be eliminated, thereby reducing a width of a terminal border.

BRIEF DESCRIPTION OF DRAWINGS

To describe the technical solutions in the embodiments of the present invention or in the prior art more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

The embodiments of the present invention provide a capacitive touchscreen and a terminal, which can ensure touch performance of a touchscreen without disposing a border configured to cover an outgoing wire area, thereby reducing a width of a terminal border.

Embodiment 1

Figure 1:
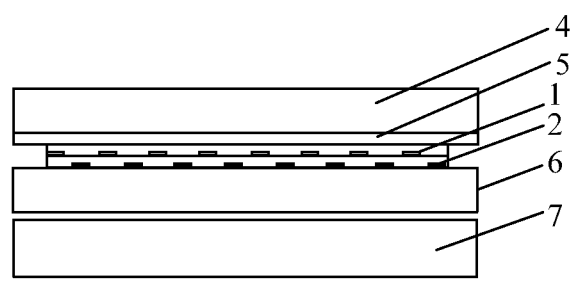
FIG. 1 is a schematic sectional view of a layer structure of a capacitive sensing device of a touchscreen in the prior art.
Figure 2:
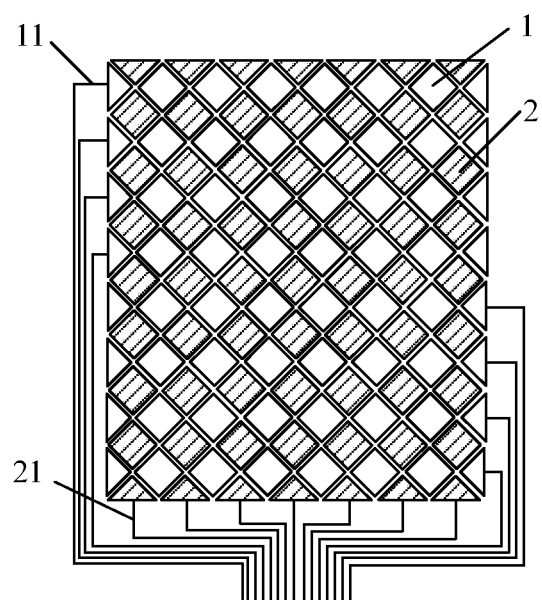
FIG. 2 is a schematic diagram showing an ITO pattern of a capacitive sensing device of a touchscreen in the prior art and wiring for connection between the capacitive sensing device and a touch IC.
Figure 3:
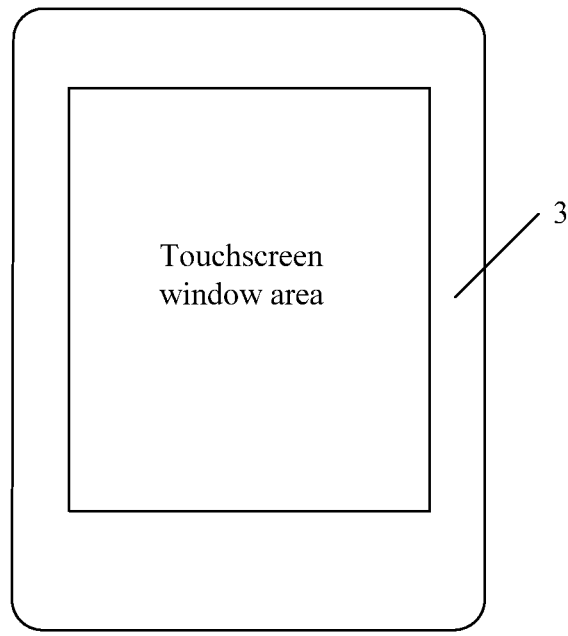
FIG. 3 is a schematic structural diagram of matching a cover lens and a border of a touchscreen in the prior art.
Figure 4:
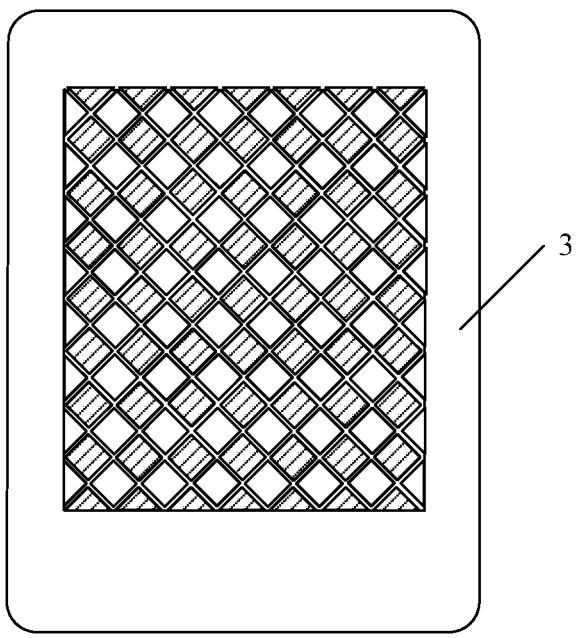
FIG. 4 is a schematic structural diagram of matching an ITO pattern and a border of a capacitive sensing device in the prior art.
Figure 5:
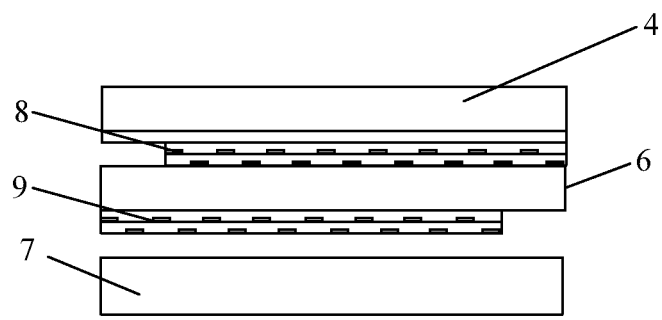
FIG. 5 is a schematic sectional view of a layer structure of a capacitive touchscreen according to an embodiment of the present invention.
Figure 6:
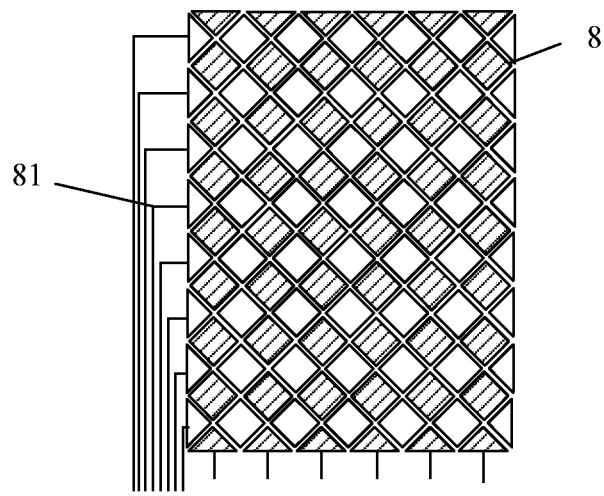
FIG. 6 is a schematic diagram of a first surface of a capacitive touchscreen according to an embodiment of the present invention.
Figure 7:
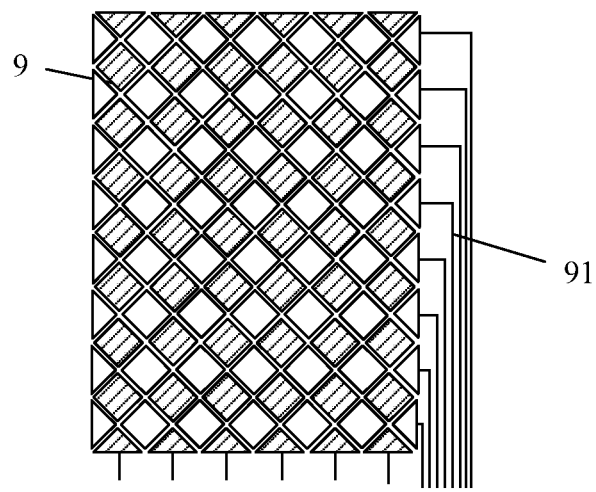
FIG. 7 is a schematic diagram of a second surface of a capacitive touchscreen according to an embodiment of the present invention.

Embodiment 1 of the present invention provides a capacitive touchscreen, and FIG. 5 shows an implementation manner of technical solutions provided in Embodiment 1 of the present invention. Referring to FIG. 5 to FIG. 7, the capacitive touchscreen includes a substrate 6, where the substrate includes a first surface and a second surface. The touchscreen further includes a first pattern 8 and a first outgoing wire 81 that are formed on the first surface of the substrate, where the first pattern covers a partial area of the first surface of the substrate, the first outgoing wire is an outgoing wire, along a first direction, of the first pattern, and the first outgoing wire is formed in a remaining area, except the first pattern, of the first surface of the substrate; and a second pattern 9 and a second outgoing wire 91 that are formed on the second surface of the substrate, where the second pattern covers a partial area of the second surface of the substrate, the second outgoing wire is an outgoing wire, along the first direction, of the second pattern, and the second outgoing wire is formed in a remaining area, except the second pattern, of the second surface of the substrate.

The first pattern 8 and the second pattern 9 are electrically conductive patterns, that is, patterns formed by an electrically conductive material. To ensure a display effect, the electrically conductive material may be an ITO material. The first outgoing wire 81 and the second outgoing wire 91 are formed by a transparent material. Preferably, the material of the outgoing wires may also be the ITO material.

The first surface and the second surface are two opposite surfaces of the substrate; and a perpendicular projection, on the first surface, of the second pattern covers at least the remaining area, except the first pattern, of the first surface.

It can be seen that a first pattern is formed on a first surface of a substrate, and a second pattern is formed on a second surface of the substrate, so that an area outside an electrically conductive pattern may be reserved separately on each surface of the substrate for outgoing wires. Because the first pattern on the first surface and the second pattern on the second surface are in a mutually complementary relationship, overall touchscreen sensing of the substrate may be completed by collaboration of the electrically conductive patterns on the two surfaces. In this way, a border existing in a current terminal may be eliminated, thereby reducing a width of a terminal border.

Embodiment 2

Embodiment 2 of the present invention provides a capacitive touchscreen, which is a specific implementation manner of the technical solutions provided in Embodiment 1, and FIG. 5 is a schematic sectional view of the capacitive touchscreen provided in Embodiment 2. The capacitive touchscreen includes the substrate 6, a cover lens 4 is disposed on an outer side of the substrate of the touchscreen, 7 is a display, and the display may be an LCD or a light emitting diode (LED) display or a display of another type, which is not limited in the embodiment of the present invention.

Embodiment 2 of the present invention mainly describes the touchscreen provided in the embodiment. As shown in FIG. 5, the first surface of the substrate 6 is an upper surface of the substrate, and the second surface of the substrate 6 is a lower surface of the substrate. Preferably, the first pattern starts extending from a first side edge of the substrate and covers a partial area of the first surface of the substrate, and the second pattern starts extending from a second side edge of the substrate and covers a partial area of the second surface of the substrate, where the first side edge and the second side edge are two opposite side edges of the substrate. In Embodiment 2 of the present invention, the first side edge is a right side edge of the substrate, the second side edge is a left side edge of the substrate, the first pattern 8 is formed on the upper surface of the substrate 6, the first pattern 8 starts extending from the right side edge of the upper surface of the substrate 6 and covers the partial area of the upper surface of the substrate, and a remaining area, except the first pattern, is used for leading out a wire, in a first direction, of the first pattern 8, that is, the first outgoing wire 81. The second pattern 9 is formed on the lower surface of the substrate 6, the second pattern 9 starts extending from the left side edge of the lower surface of the substrate 6 and covers the partial area of the lower surface of the substrate, and a remaining area, except the second pattern, is used for leading out a wire, in the first direction, of the second pattern 9, that is, the second outgoing wire 91.

A detailed description is provided in the following. The first surface of the substrate is shown in FIG. 6, and the first pattern 8 is formed on the first surface of the substrate, where the first pattern 8 includes a horizontal (namely, in an X direction) sliding strip and a vertical (namely, in a Y direction) sliding strip. For ease of description, in FIG. 6, a blank figure represents the horizontal sliding strip, and a figure including slanting stripes represents the vertical sliding strip. In this example, the first direction is set as the horizontal direction, namely, the X direction. The first outgoing wire 81 is an outgoing wire of the sliding strip, in the horizontal direction, of the first pattern 8 and is formed in the remaining area, except the first pattern 8, of the first surface of the substrate. In the embodiment of the present invention, all outgoing wires in the horizontal direction may be arranged on the left side of the first pattern 8 using an outgoing wire process of an electrically conductive pattern.

Similarly, the second surface of the substrate is shown in FIG. 7, and the second pattern 9 is formed on the second surface of the substrate, where the second pattern 9 includes a horizontal (namely, in the X direction) sliding strip and a vertical (namely, in the Y direction) sliding strip. For ease of description, in FIG. 7, a blank figure represents the horizontal sliding strip, and a figure including slanting stripes represents the vertical sliding strip. In this example, the first direction is set as the horizontal direction, namely, the X direction. The second outgoing wire 91 is an outgoing wire of the sliding strip, in the horizontal direction, of the second pattern 9, and the second outgoing wire 91 is formed in the remaining area, except the second pattern 9, of the second surface of the substrate. In the embodiment of the present invention, all outgoing wires in the horizontal direction may be arranged on the right side of the second pattern 9 using an outgoing wire process of an electrically conductive pattern.

It should be noted that, the case shown in FIG. 5 is a case in which the perpendicular projection, on the first surface of the substrate, of the second pattern 9 overlaps with the first pattern 8, which, however, does not impose any limitation on the embodiment of the present invention. The perpendicular projection, on the first surface of the substrate, of the second pattern 9 may also not overlap with the first pattern 8 at all, that is, a case in which the perpendicular projection, on the first surface, of the second pattern 9 covers exactly the remaining area, except the first pattern 8, of the first surface is also feasible.

It should further be noted that, the technical solutions provided in the embodiment of the present invention are only exemplary, and a glass substrate or a substrate of a film material may be used as the substrate, with the glass substrate being preferable; the first surface and the second surface have no hierarchical relationship and may be interchanged arbitrarily; both the first pattern 8 and the second pattern 9 are electrically conductive patterns with no limitation on a shape. To make the description clear, the embodiment of the present invention uses rectangular pattern for description. However, in a actual applications, the first pattern 8 and the second pattern 9 may be in other shapes (for example, a triangular shape), as long as the perpendicular projection, on the first surface, of the second pattern 9 covers at least the remaining area, except the first pattern 8, of the first surface, the remaining area, except the first pattern 8, of the first surface is adequate for the first outgoing wire 81 of the first pattern 8, and the remaining area, except the second pattern 9, of the second surface is adequate for the second outgoing wire 91 of the second pattern 9. In addition, the edges from which extension starts when the first pattern 8 and the second pattern 9 are formed may also be interchanged arbitrarily; both the first pattern 8 and the second pattern 9 are electrically conductive patterns, and rhombuses are used as figures forming the electrically conductive patterns in the exemplary figure of the embodiment. However, a rectangle, a square, or the like may also be used in actual applications. The embodiment of the present invention does not impose any limitation on the foregoing technical features.

Figure 8:
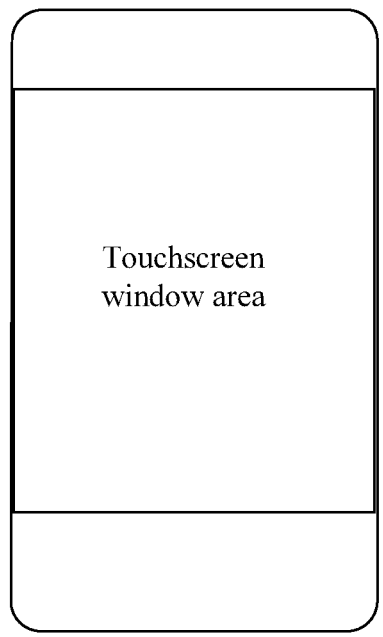
FIG. 8 is a schematic diagram of a technical effect of applying a capacitive touchscreen according to an embodiment of the present invention to a terminal.

The perpendicular projection, on the first surface, of the second pattern 9 covers the remaining area, except the first pattern 8, of the first surface, and therefore it can be ensured that the entire substrate 6 is completely covered by at least one layer of electrically conductive pattern in an entire area of the first surface or the second surface. A perpendicularly projected area, on the second surface, of the remaining area, except the first pattern 8, of the first surface is covered by the second pattern 9, and a perpendicularly projected area, on the first surface, of the remaining area, except the second pattern 9, of the second surface is covered by the first pattern 8, so that it can be ensured that touch performance may be implemented in a remaining area, except a pattern area, on the two surfaces without reserving an outgoing wire area in an area outside the electrically conductive patterns on the substrate of the touchscreen, as shown in FIG. 8, and therefore a touchscreen border may be effectively reduced or even eliminated.

In addition, preferably, the partial area, occupied by the first pattern 8, on the first surface and/or the partial area, occupied by the second pattern 9, on the second surface may be a half or two thirds, starting to extend from the first side edge or the second side edge of the substrate, of an area of the substrate. This area range can not only take balance and aesthetics of substrate production into consideration, but also ensure that a sum of an area of the first pattern area and an area of the second pattern area can completely cover the entire area of the substrate, and in addition, can increase precision of locating a touch in an overlapping area between a projection, on a horizontal plane on which the second pattern area is located, of the first pattern area and the second pattern area.

Embodiment 3

Embodiment 3 of the present invention provides a terminal device to which the touchscreen described in the foregoing embodiments is applied. That is, the embodiment of the present invention further provides a terminal, where the terminal includes a touchscreen, the touchscreen includes a substrate, and the substrate includes a first surface and a second surface. The touchscreen further includes a first pattern and a first outgoing wire that are formed on the first surface of the substrate, where the first pattern covers a partial area of the first surface of the substrate, the first outgoing wire is an outgoing wire, along a first direction, of the first pattern, and the first outgoing wire is formed in a remaining area, except the first pattern, of the first surface of the substrate; and a second pattern and a second outgoing wire that are formed on the second surface of the substrate, where the second pattern covers a partial area of the second surface of the substrate, the second outgoing wire is an outgoing wire, along the first direction, of the second pattern, and the second outgoing wire is formed in a remaining area, except the second pattern, of the second surface of the substrate. The first surface and the second surface are two opposite surfaces of the substrate; and a perpendicular projection, on the first surface, of the second pattern covers at least the remaining area, except the first pattern, of the first surface.

It can be seen that a first pattern is formed on a first surface of a substrate, and a second pattern is formed on a second surface of the substrate, so that an area outside an electrically conductive pattern may be reserved separately on each surface of the substrate for outgoing wires. Because the first pattern on the first surface and the second pattern on the second surface are in a mutually complementary relationship, overall touchscreen sensing of the substrate may be completed by collaboration of the electrically conductive patterns on the two surfaces. In this way, a border existing in a current terminal may be eliminated, thereby reducing a width of a terminal border.

Embodiment 4

Figure 9:
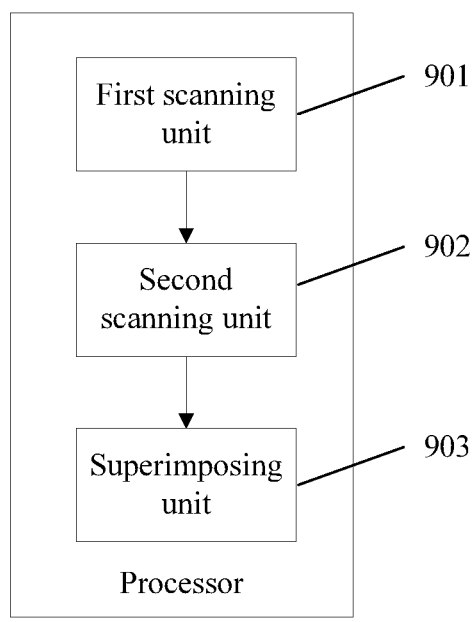
FIG. 9 is a schematic structural diagram of a terminal according to Embodiment 4 of the present invention.

Embodiment 4 of the present invention further provides a terminal, including a touchscreen. The touchscreen is the touchscreen described in the foregoing embodiments and includes a substrate. The substrate includes two opposite surfaces, that is, a first surface and a second surface. The touchscreen further includes a first pattern formed on the first surface of the substrate and a second pattern formed on the second surface of the substrate, the first pattern covers a partial area of the first surface of the substrate, the second pattern covers a partial area of the second surface of the substrate, the first surface and the second surface are two opposite surfaces of the substrate, and a perpendicular projection, on the first surface, of the second pattern covers at least a remaining area, except the first pattern, of the first surface. As shown in FIG. 9, the terminal further includes a first scanning unit 901 configured to acquire a first sensing coordinate by scanning the first pattern; a second scanning unit 902 configured to acquire a second sensing coordinate by scanning the second pattern; and a superimposing unit 903 configured to acquire a sensing coordinate according to the first sensing coordinate and the second sensing coordinate.

In an application scenario, the first scanning unit 901 may be configured to acquire the first sensing coordinate by scanning the whole first pattern; the second scanning unit 902 may be configured to acquire the second sensing coordinate by scanning the whole second pattern. In this case, because the perpendicular projection, on the first surface of the substrate of the second pattern overlaps with the first pattern, an overlapping part is included in the first sensing coordinate and the second coordinate, and therefore, a sensing coordinate of the overlapping part needs to be calculated. In this scenario, the superimposing unit 903 includes a first sensing coordinate classifying unit 9031 configured to classify the first sensing coordinate into a first overlapping area sensing coordinate and a first non-overlapping area sensing coordinate according to an overlapping area and a non-overlapping area of the first pattern, where the overlapping area of the first pattern refers to an area overlapping with the perpendicular projection, on the first pattern, of the second pattern, and the non-overlapping area of the first pattern refers to an area not overlapping with the perpendicular projection, on the first pattern, of the second pattern; a second sensing coordinate classifying unit 9032 configured to classify the second sensing coordinate into a second overlapping area sensing coordinate and a second non-overlapping area sensing coordinate according to an overlapping area and a non-overlapping area of the second pattern, where the overlapping area of the second pattern refers to an area overlapping with a perpendicular projection, on the second pattern, of the first pattern, and the non-overlapping area of the second pattern refers to an area not overlapping with the perpendicular projection, on the first pattern, of the first pattern; an overlapping area sensing coordinate calculating unit 9033 configured to perform calculation on the first overlapping area sensing coordinate and the second overlapping area sensing coordinate to acquire an overlapping area sensing coordinate, where the calculation may be performed using various algorithms, for example, obtaining an average or obtaining a sum in a weighting manner before obtaining an average, and in this way, interference from an external factor or an impact caused, during a finger touch, by a slight change in displacement may be avoided effectively; and a first superimposing subunit 9034 configured to superimpose the first non-overlapping area sensing coordinate, the second non-overlapping area sensing coordinate and the overlapping area sensing coordinate to acquire the sensing coordinate.

In another application scenario, the first scanning unit may be configured to acquire the first sensing coordinate by scanning the whole first pattern; the second scanning unit is configured to acquire the second sensing coordinate by scanning a complementary area of the second pattern, where the complementary area refers to an area that is on the second pattern and does not overlap with a perpendicular projection, on the second pattern, of the first pattern. In this case, the superimposing unit is configured to acquire the sensing coordinate by superimposing the first sensing coordinate and the second sensing coordinate.

Based on the foregoing descriptions of the implementation manners, a person skilled in the art may clearly understand that the present invention may be implemented by software in addition to necessary hardware or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, a network device, or the like) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:
1. A capacitive touchscreen comprising:
   a substrate comprising a first surface and a second surface;

a first pattern;
a first outgoing wire, wherein the first pattern and the first outgoing wire are formed on the first surface of the substrate, wherein the first pattern covers a partial area of the first surface of the substrate and extends to a first side edge of the substrate, wherein the first outgoing wire is an outgoing wire along a first direction of the first pattern, wherein the first outgoing wire is formed in a remaining area, except the first pattern, of the first surface of the substrate, wherein the remaining area of the first surface of the substrate extends to a second side edge of the substrate, and wherein the partial area of the first surface of the substrate is less than all of the first surface of the substrate;
a second pattern; and
a second outgoing wire, wherein the second pattern and the second outgoing wire are formed on the second surface of the substrate, wherein the second pattern covers a partial area of the second surface of the substrate and extends to the second side edge of the substrate, wherein the second outgoing wire is an outgoing wire along the first direction of the second pattern, wherein the second outgoing wire is formed in a remaining area, except the second pattern, of the second surface of the substrate, wherein the first surface and the second surface are two opposite surfaces of the substrate, wherein a perpendicular projection on the first surface of the second pattern covers at least the remaining area, except the first pattern, of the first surface, wherein the partial area of the second surface of the substrate is less than all of the second surface of the substrate, wherein the remaining area of the second surface of the substrate extends to the first side edge of the substrate, and wherein the first side edge and the second side edge are two opposite side edges of the substrate.

2. The capacitive touchscreen according to claim 1, wherein the remaining area does not overlap the partial area of the first surface of the substrate, wherein the remaining area does not overlap the partial area of the second surface of the substrate, wherein the first pattern extends to the first side edge, wherein the second pattern extends to the second side edge, wherein the first outgoing wire is oriented along a first direction of the substrate, and wherein the second outgoing wire is oriented along the first direction.

3. The capacitive touchscreen according to claim 2, wherein the first pattern comprises a first horizontal sliding strip and a first vertical sliding strip, wherein the first horizontal sliding strip and the first vertical sliding strip are distributed in an intersecting manner, wherein the second pattern comprises a second horizontal sliding strip and a second vertical sliding strip, and wherein the second horizontal sliding strip and the second vertical sliding strip are distributed in an intersecting manner.

4. The capacitive touchscreen according to claim 2, wherein the partial area of the first surface of the substrate is half to two-thirds of the first surface, and wherein the partial area of the second surface of the substrate half to two-thirds of the second surface.

5. The capacitive touchscreen according to claim 4, wherein the first pattern comprises a first horizontal sliding strip and a first vertical sliding strip, wherein the first horizontal sliding strip and the first vertical sliding strip are distributed in an intersecting manner, wherein the second pattern comprises a second horizontal sliding strip and a second vertical sliding strip, and wherein the second horizontal sliding strip and the second vertical sliding strip are distributed in an intersecting manner.

6. The capacitive touchscreen according to claim 1, wherein the remaining area of the first surface of the substrate does not overlap the remaining area of the second surface of the substrate wherein the partial area of the first surface of the substrate is half to two-thirds of the first surface, and wherein the partial area of the second surface of the substrate is half to two-thirds of the second surface.

7. The capacitive touchscreen according to claim 6, wherein the first pattern comprises a first horizontal sliding strip and a first vertical sliding strip, wherein the first horizontal sliding strip and the first vertical sliding strip are distributed in an intersecting manner, wherein the second pattern comprises a second horizontal sliding strip and a second vertical sliding strip, and wherein the second horizontal sliding strip and the second vertical sliding strip are distributed in an intersecting manner.

8. The capacitive touchscreen according to claim 1, wherein the first pattern comprises a first horizontal sliding strip and a first vertical sliding strip, wherein the first horizontal sliding strip and the first vertical sliding strip are distributed in an intersecting manner, wherein the second pattern comprises a second horizontal sliding strip and a second vertical sliding strip, and wherein the second horizontal sliding strip and the second vertical sliding strip are distributed in an intersecting manner.

9. The capacitive touchscreen according to claim 8, wherein the first outgoing wire comprises a third outgoing wire of the horizontal sliding strip that is oriented along a horizontal direction of the substrate, and wherein the second outgoing wire comprises a fourth outgoing wire of the horizontal sliding strip that is oriented along the horizontal direction.

10. The capacitive touchscreen according to claim 1, wherein both the first outgoing wire and the second outgoing wire are formed of a transparent material.

11. A terminal comprising a touchscreen, the touchscreen comprising a substrate, and the substrate comprising a first surface and a second surface, wherein the touchscreen further comprises:
a first pattern;
a first outgoing wire wherein the first pattern and the first outgoing wire are formed on the first surface of the substrate, wherein the first pattern covers a partial area of the first surface of the substrate and extends to a first side edge of the substrate, wherein the first outgoing wire is an outgoing wire along a first direction of the first pattern, wherein the first outgoing wire is formed in a remaining area, except the first pattern, of the first surface of the substrate, wherein the remaining area of the first surface of the substrate extends to a second side edge of the substrate, and wherein the partial area of the first surface of the substrate is less than all of the first surface of the substrate;
a second pattern; and
a second outgoing wire wherein the second pattern and the second outgoing wire are formed on the second surface of the substrate, wherein the second pattern covers a partial area of the second surface of the substrate and extends to the second side edge of the substrate, wherein the second outgoing wire is an outgoing wire along the first direction of the second pattern, wherein the second outgoing wire is formed in a remaining area, except the second pattern, of the second surface of the substrate, wherein the first surface and the second surface are two opposite surfaces of the substrate, wherein a perpendicular projection on the first surface of the second pattern covers at least the remaining area, except the first pattern, of the first surface, wherein the partial area of the second surface of the substrate is less than all of the second surface of the substrate, wherein the remaining area of the second surface of the substrate extends to the first side edge of the substrate, and wherein the first side edge and the second side edge are two opposite side edges of the substrate.

12. The terminal according to claim 11, wherein the first pattern extends from the first side edge of the first surface of the substrate and covers the partial area of the first surface of the substrate, and wherein the second pattern extends from the second side edge of the second surface of the substrate and covers the partial area of the second surface of the substrate.

13. A terminal comprising:
a touchscreen comprising:
a substrate, wherein the substrate comprises a first surface and a second surface;
a first pattern;
a first outgoing wire, wherein the first pattern and the first outgoing wire are formed on the first surface of the substrate, wherein the first pattern covers a partial area of the first surface of the substrate and extends to a first side edge of the substrate, wherein the first outgoing wire is an outgoing wire along a first direction of the first pattern, wherein the first outgoing wire is formed in a remaining area, except the first pattern, of the first surface of the substrate, wherein the remaining area of the first surface of the substrate extends to a second side edge of the substrate, and wherein the partial area of the first surface of the substrate is less than all of the first surface of the substrate;
a second pattern; and
a second outgoing wire wherein the second pattern and the second outgoing wire are formed on the second surface of the substrate, wherein the second pattern covers a partial area of the second surface of the substrate and extends to the second side edge of the substrate, wherein the second outgoing wire is an outgoing wire along the first direction of the second pattern, wherein the second outgoing wire is formed in a remaining area, except the second pattern, of the second surface of the substrate, wherein the first surface and the second surface are two opposite surfaces of the substrate, wherein a perpendicular projection on the first surface of the second pattern covers at least the remaining area, except the first pattern, of the first surface, wherein the partial area of the second surface of the substrate is less than all of the second surface of the substrate, wherein the remaining area of the second surface of the substrate extends to the first side edge of the substrate, and wherein the first side edge and the second side edge are two opposite side edges of the substrate;

a scanner configured to:
acquire a first sensing coordinate by scanning the first pattern; and
acquire a second sensing coordinate by scanning the second pattern; and
a processor coupled to the touchscreen and the scanner and configured to acquire a sensing coordinate according to the first sensing coordinate and the second sensing coordinate.

14. The terminal according to claim 13, wherein the scanner is further configured to:
acquire the first sensing coordinate by scanning the whole first pattern; and
acquire the second sensing coordinate by scanning the whole second pattern, and
wherein the processor is further configured to:
classify the first sensing coordinate into a first overlapping area sensing coordinate and a first non-overlapping area sensing coordinate according to an overlapping area and a non-overlapping area of the first pattern, wherein the overlapping area of the first pattern refers to an area overlapping with the perpendicular projection on the first pattern of the second pattern, and wherein the non-overlapping area of the first pattern refers to an area not overlapping with the perpendicular projection on the first pattern of the second pattern;
classify the second sensing coordinate into a second overlapping area sensing coordinate and a second non-overlapping area sensing coordinate according to an overlapping area and a non-overlapping area of the second pattern, wherein the overlapping area of the second pattern refers to an area overlapping with a perpendicular projection on the second pattern of the first pattern, and wherein the non-overlapping area of the second pattern refers to an area not overlapping with the perpendicular projection on the second pattern of the first pattern;
perform calculation on the first overlapping area sensing coordinate and the second overlapping area sensing coordinate to acquire an overlapping area sensing coordinate; and
superimpose the first non-overlapping area sensing coordinate, the second non overlapping area sensing coordinate and the overlapping area sensing coordinate to acquire the sensing coordinate.

15. The terminal according to claim 13, wherein the scanner is further configured to:
acquire the first sensing coordinate by scanning the whole first pattern; and
acquire the second sensing coordinate by scanning a complementary area of the second pattern, wherein the complementary area refers to an area that is on the second pattern and does not overlap with a perpendicular projection on the second pattern of the first pattern, and
wherein the processor is further configured to superimpose the first sensing coordinate and the second sensing coordinate to acquire the sensing coordinate.

* * * * *